Feb. 25, 1930.  M. C. SCROTE  1,748,622
TIRE MAKING MACHINE
Filed Oct. 25, 1927
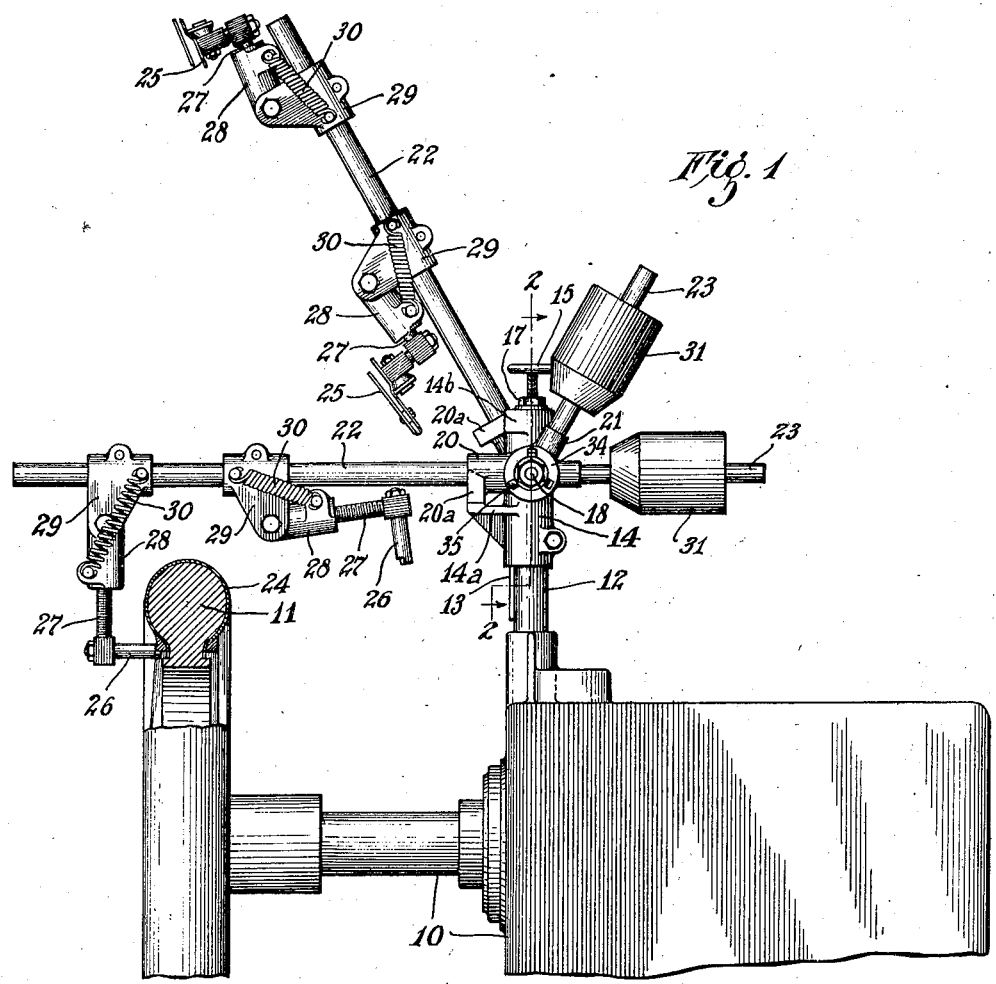
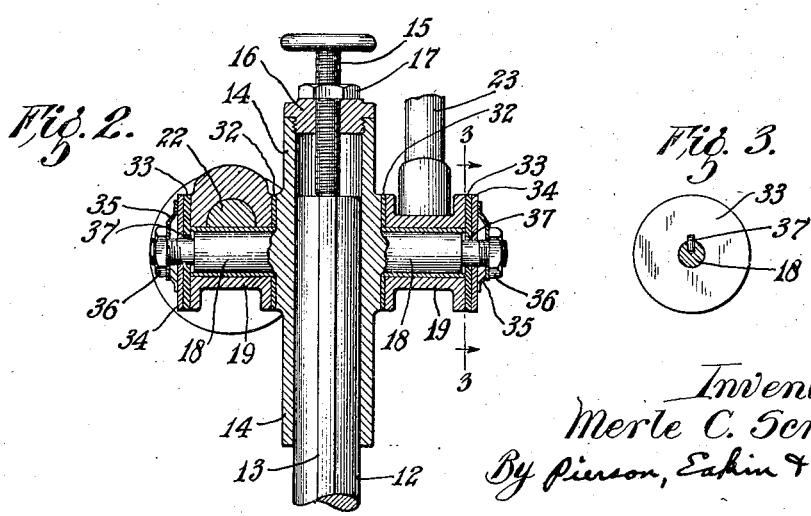
Inventor
Merle C. Scrote
By Pierson, Eakin & Avery
Attys.

Patented Feb. 25, 1930

1,748,622

UNITED STATES PATENT OFFICE

MERLE C. SCROTE, OF KENMORE, OHIO, ASSIGNOR TO THE B. F. GOODRICH COMPANY, OF NEW YORK, N. Y., A CORPORATION OF NEW YORK

TIRE-MAKING MACHINE

Application filed October 25, 1927. Serial No. 228,607.

This invention relates to tire-making machines and especially to tool mountings pivotally mounted and adapted to be turned about their pivots to bring the tools carried thereby into operative position with relation to a rotatably mounted tire-building core.

My chief objects are to provide a machine in which the pivoted tool-mounting will be so constructed and arranged as to be easily turned upon its pivot to and from operative position without such violence of movement (into its operative or into its inoperative position) as occurred with mountings heretofore employed; to provide a pivoted tool-mounting adapted to remain in whatever position it is released in by the operator; to provide a pivoted tool-mounting strongly held by gravity in its operative position and also in its inoperative position without being subject to violent movement by gravity into either of those positions; and to provide a tool-mounting adapted for ready adjustment to operate in conjunction with tire cores of different diameters mounted on the tire-making machine.

Of the accompanying drawings,

Fig. 1 is an elevation of parts of a tire-making machine embodying my invention in its preferred form, the tire core and the work thereon being sectioned and broken away.

Fig. 2 is a section on a line 2—2 of Fig. 1.

Fig. 3 is a section on line 3—3 of Fig. 2.

Referring to the drawings, the machine comprises a device 10 of known type for supporting and rotating a tire-building core 11 mounted thereon.

Secured upon and rising from the frame of the core rotating device is a vertical post 12 formed with a vertical spline 13 on one side thereof. A bracket 14 formed with a sleeve having an internal groove fitting the spline 13 is slidably mounted upon the post 12 and is adapted to be raised and lowered thereon by means of a hand screw 15 threaded through a cap 16 mounted upon the upper end of the bracket's sleeve, the screw 15 being adapted to bear against the upper end face of the post 12 and having a lock nut 17 co-acting with the cap 16 to secure the screw in positions of adjustment.

At each side the bracket 14 is formed with a stub shaft 18 upon which is journaled a hub-member 19 formed with sockets 20, 21 for a tool-mounting bar 22 and a counter-weight bar 23, the socket 20 being formed with a stop lug 20ª adapted to abut a projection 14ª formed on the bracket 14 to stop the tool-mounting bar 22 in position for the tools mounted thereon to operate upon a partly built tire 24 mounted upon the core 11, and to abut a projection 14ᵇ also formed on said bracket for stopping the bar in its inoperative position of rest. Tire tools such as the finishing strip guides 25, 25 or the bead guiding tools 26, 26 are mounted upon respective threaded arms 27, 27 which are screwed into, and adapted to be clamped against rotation by, respective split clamping members 28, 28, each clamping member being pivoted upon a bracket 29 adjustably clamped upon the tool-mounting bar 22, a pair of such tool assemblies being mounted upon each of the bars 22 for concurrent action of the tools at opposite sides of the tire core 11. Each clamping member 28 is connected with the bracket 29 by an over-center pull spring 30 adapted to hold the tool alternately in operative relation to the core, as shown in Fig. 1 with respect to one of the bead guiding tools 26, or in inoperative position, away from the core, as shown with respect to the other bead guiding tool 26 in Fig. 1.

Secured upon each of the counter-weight bars 23 is a counter-weight 31, and the sockets 20 and 21 for the tool-mounting bar 22 and the counter-weight bar 23 respectively of each of the hub-members 19 are positioned at such an angle to each other about the shaft 18 of the hub-member that when the tool-mounting bar 22 is in its elevated, inoperative position, as shown with respect to the farther tool arm in Fig. 1, its counter-weight bar 23 will be horizontally disposed and consequently acting with approximately its maximum leverage, while the tool-mounting bar 22 acts with less leverage than it does when in horizontal position. The construction thus is such that gravity will act with a strong force to retain the tool-mounting bar in its elevated position.

The described angular relation of the tool-mounting bar 22 and the counter-weight arm 23 also is such that when the tool-mounting bar 22 is in its horizontal, operative position, as shown with respect to the nearer bar 22 in Fig. 1, the bar will be urged downward by gravity with approximately its maximum leverage, whereas the counter-weight arm 23, being in an inclined position, will have a comparatively small leverage against the downward force of the tool-mounting bar 22 and consequently the tool-mounting bar will be strongly held by gravity in its lowermost, operative position.

The structure may be defined in different language by saying that the angular relation of the bars 22 and 23 is such that the center of gravity of the pivoted structure as a whole is higher than the shaft 18 and is in such position that it passes over-center with relation to the shaft 18 when the tool-mounting bar 22 is moved between its operative and inoperative positions, so that the force of gravity upon the pivoted structure as a whole acts through the center of gravity at the left side of the shaft 18 in Fig. 1 when the tool-mounting bar 22 is in horizontal, operative position, and lifting of the tool bar to the inoperative position carries the center of gravity over the shaft 18 to the right-hand side thereof, so that gravity then acts to hold the tool-mounting bar elevated.

To prevent violent movement of the pivoted structure into either of these positions, each hub-member 19 has mounted on each face thereof a friction washer 32 or 33, preferably formed of fibrous material, and the friction washers and hub-member are held in frictional engagement with each other by a metallic washer 34 mounted upon a reduced end portion of the stub shaft 18 and yieldingly urged inward thereon by a spring clip 35 backed by a nut 36 screwed upon the end of the stub shaft. To prevent rotation of the friction washers 33, each has its inner periphery formed with a notch and these notches engage respective studs or pins 37, 37 projecting from the reduced portions of the stub shafts 18, as shown in Figs. 2 and 3.

The operation of the device with regard to a tire core of given size will be clearly understood from the foregoing description.

When a tire core of different size is mounted upon the rotating device 10 the tool-mounting assembly is appropriately raised and lowered upon the post 12 by resetting of the hand screw 15 and the brackets 29, supporting the individual tools, are appropriately reset, farther apart or closer together, upon the tool-mounting bar 22.

The device provides, with very simple construction, the advantages set out in the above statement of objects.

Various modifications are possible within the scope of my invention as defined in the appended claims.

I claim:

1. In a tire-making machine the combination of a rotatably supported tire-building core and a pivoted tool-mounting structure adapted to be swung into and out of operative relation to the core and having its center of gravity so positioned as to pass over center with relation to its pivot as it is so swung and frictional means for braking the structure against pivotal movement.

2. In a tire-making machine the combination of a rotatably supported tire-building core, a vertical guide member at one side of the core, a bracket slidably mounted on said guide member, means for securing the bracket at different elevations thereon, a hub-member pivoted on said bracket, and a tool arm and a counter-weight arm projecting from said hub-member, the tool arm being adapted to be swung to a substantially horizontal operative position with relation to the core and the counter-weight arm being so angularly disposed with relation to the tool arm as to stand in an approximately vertical position when the tool arm is horizontal.

3. A combination as defined in claim 2 including frictional means for braking the angular movement of the hub-member.

In witness whereof I have hereunto set my hand this 20th day of October, 1927.

MERLE C. SCROTE.